Dec. 15, 1959     D. EDWARDS     2,916,869
STRAW DUMP SPREADER
Filed May 15, 1958     4 Sheets-Sheet 1
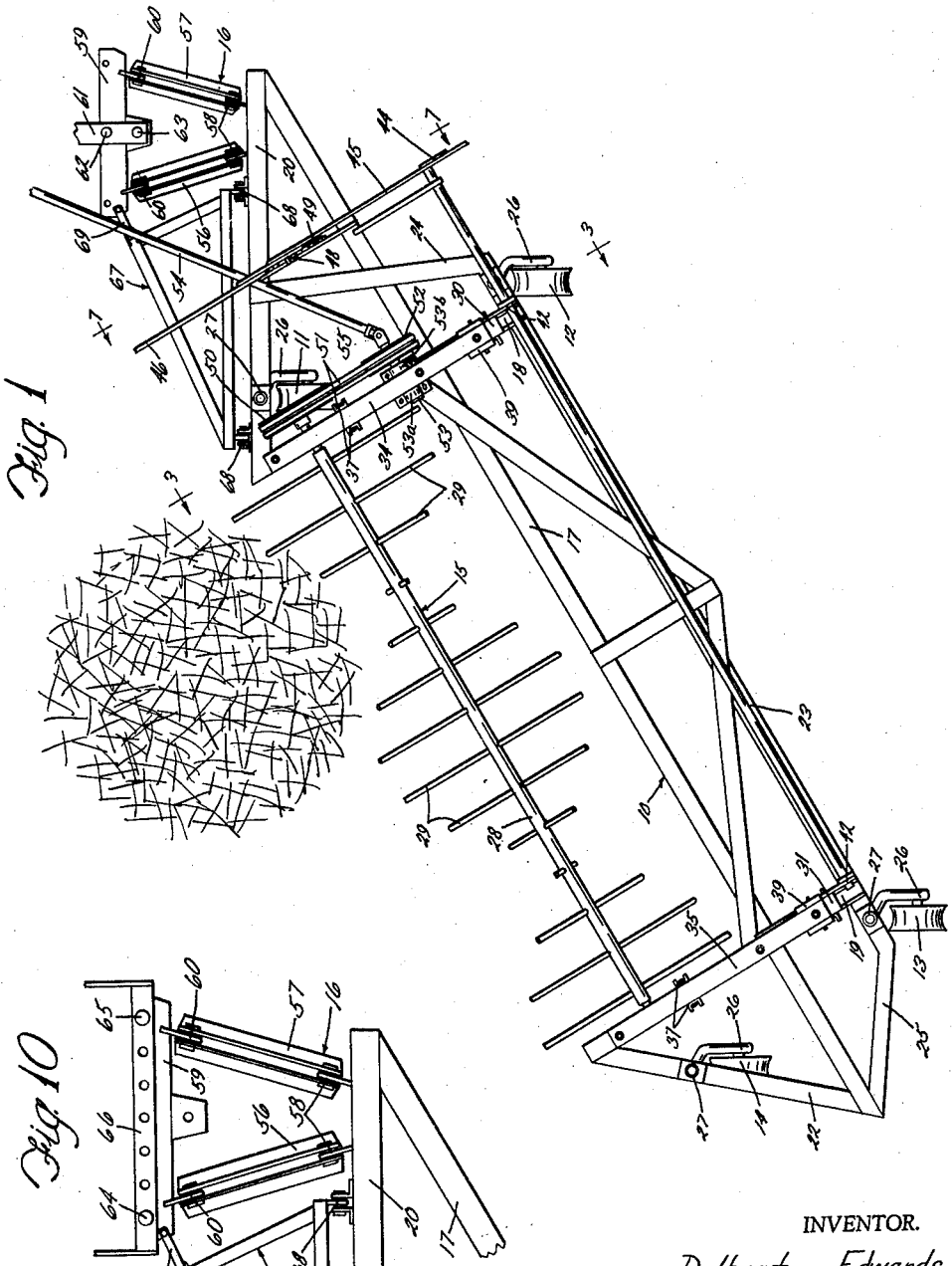
INVENTOR.
Delbert Edwards
BY
Atty.

Dec. 15, 1959  D. EDWARDS  2,916,869
STRAW DUMP SPREADER
Filed May 15, 1958  4 Sheets-Sheet 2
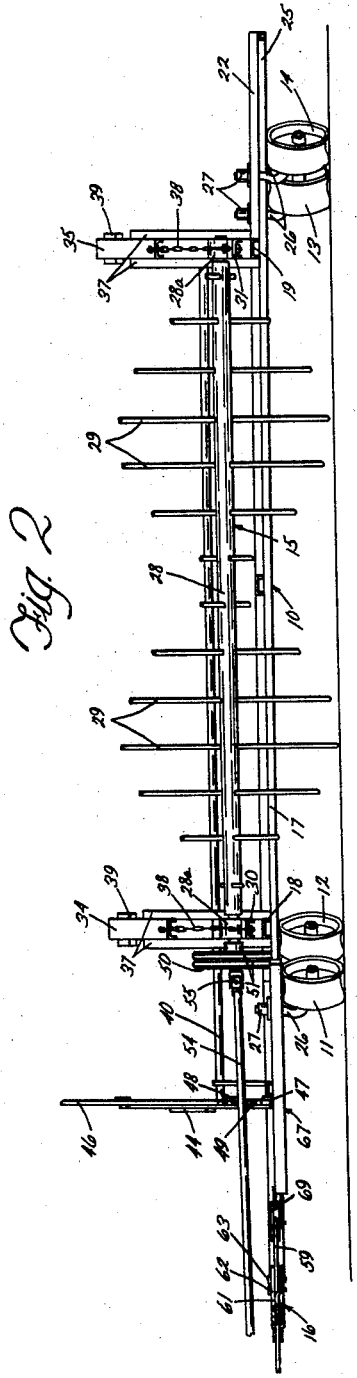
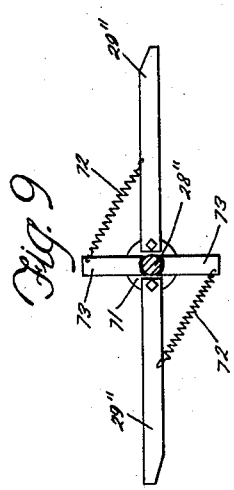
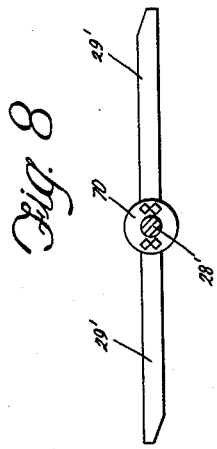
INVENTOR.
Delbert Edwards
BY
Atty.

Dec. 15, 1959  D. EDWARDS  2,916,869
STRAW DUMP SPREADER
Filed May 15, 1958  4 Sheets-Sheet 3

INVENTOR.
Delbert Edwards
BY
Atty.

Dec. 15, 1959 D. EDWARDS 2,916,869
STRAW DUMP SPREADER
Filed May 15, 1958 4 Sheets-Sheet 4
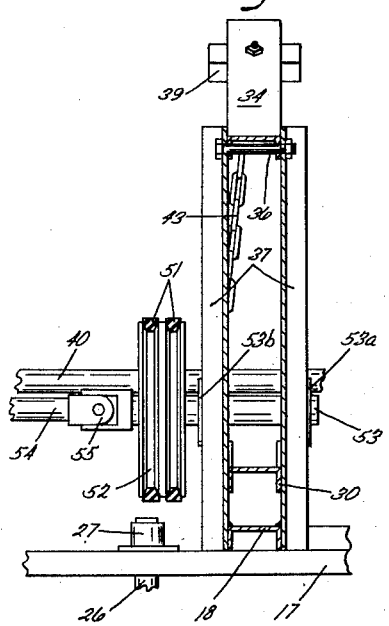
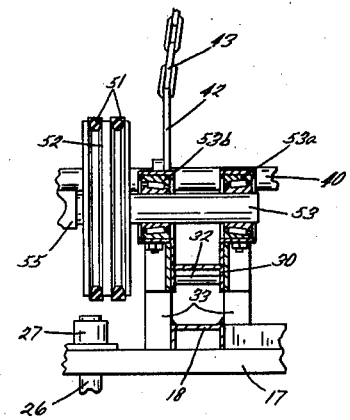
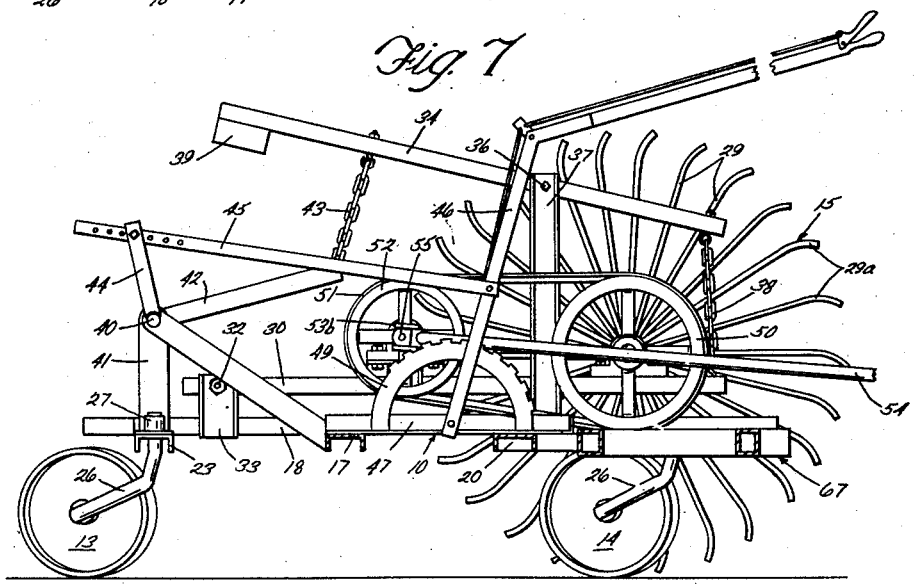
INVENTOR.
Delbert Edwards
BY
Atty.

United States Patent Office 2,916,869
Patented Dec. 15, 1959

2,916,869

STRAW DUMP SPREADER

Delbert Edwards, Condon, Oreg.

Application May 15, 1958, Serial No. 735,468

4 Claims. (Cl. 56—372)

The present invention relates to improvements in straw dump spreaders.

It has for many years been the practice among farmers who raise livestock as well as grain crops, to utilize the harvesting residue, that is, the straw, chaff, etc., of their grain crops as livestock feed. The present practice is to discharge the straw, etc. from the harvester in spaced apart piles in the field during the harvesting operation, and then turn the livestock into the grain fields to feed directly from the piles or dumps. The livestock are generally permitted to remain in the fields throughout the winter.

While this practice has proved successful, it is not without drawbacks. By spring, the uneaten portions of the dumps are well trampled and packed by the livestock so that they form tough, thick mats that cannot be readily worked into the soil when the fields are cultivated.

It is the purpose of this invention to provide a machine which is capable of being pulled through the field over the dumps and which is operable to break up and spread the matted straw dumps apart so that the straw therefrom may be worked into the soil in the desired manner.

More specifically it is the purpose of the invention to provide such a machine which includes a diagonally positioned rotor having radial teeth thereon and means to rotate said rotor at a relatively high speed to cause said teeth to engage with the matted dumps and throw the straw therefrom diagonally forward and to one side to spread said straw over a relatively wide area.

Another purpose of the invention is to provide in such a machine novel counterbalanced support means for the rotor operable to support the rotor in substantially weightless condition on the ground to cause it to follow the ground contour.

It is also a purpose of my invention to provide novel control means for adjusting the height of the rotor with respect to the carrying frame of the machine.

These and other objects and advantages of my invention will appear more clearly from the following detailed description and the accompanying drawings, wherein a preferred form of the invention is shown. It will be understood that the drawings and description are illustrative only, however, and are not intended to limit the invention except insofar as it is limited by the appended claims.

In the drawings:

Figure 1 is a plan view of my invention;

Figure 2 is a front elevational view with parts broken away and parts shown in section;

Figure 5 is an enlarged fragmentary sectional view taken on the line 5—5 of Figure 3 showing parts of the drive structure not visible in Figure 3, but shown in Figure 1 from which Figure 3 is taken;

Figure 6 is an enlarged fragmentary sectional view taken on the line 6—6 of Figure 3 showing parts of the drive structure not visible in Figure 3, but shown in Figure 1 from which Figure 3 is taken;

Figure 7 is an enlarged sectional view taken on the line 7—7 of Figure 1;

Figure 8 is an enlarged cross sectional view of the rotor showing a modification thereof;

Figure 9 is a view similar to Figure 8, but showing a further modified form of the rotor; and Figure 10 is an enlarged fragmentary plan view illustrating the tow frame.

Figure 3:
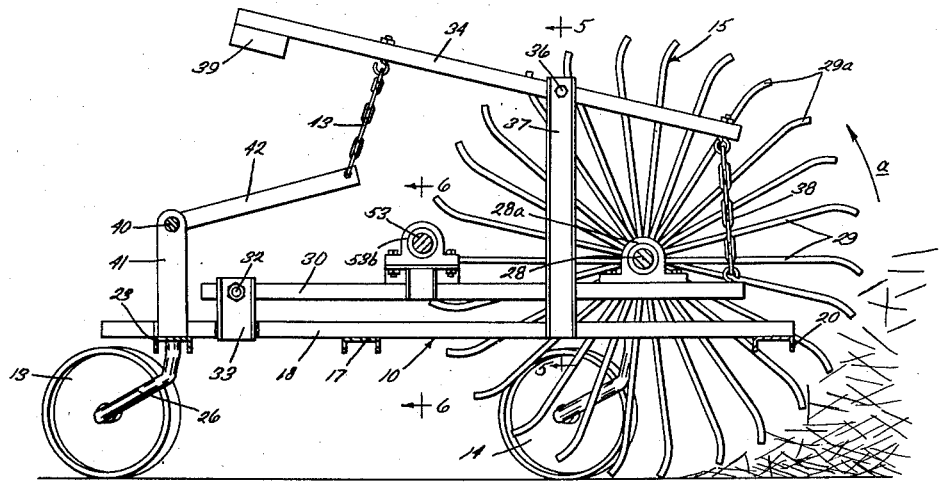
Figure 3 is an enlarged sectional view taken on the line 3—3 of Figure 1.

Referring now to the drawings, and to Figures 1 and 2 in particular, my invention comprises generally a main frame 10 which is supported for movement over the ground by caster wheels 11, 12, 13 and 14 and which support thereon a toothed straw spreading rotor 15. The frame 10 has a tow frame 16 at its forward end, and extends diagonally rearwardly and to one side from the tow frame 16 to position the rotor 15 at an acute angle to the direction of travel. Straw, etc. engaged thereby will thus be thrown off to one side and spread over a relatively wide area.

The frame 10 comprises a main diagonally extending beam 17 which has two spaced apart frame members 18 and 19 mounted thereon and extending perpendicular thereto intermediate its ends. At the right hand end of the frame 10, a transverse member 20 is connected between the adjacent end of the beam 17 and the forward end of the perpendicular member 18. The tow frame 16 (described in detail later herein) is connected to the member 20. At the left hand end of the beam 17, a generally forwardly extending brace 22 is provided. The brace 22 connects to the forward end of the perpendicular member 19. A short distance behind the beam 17, a shorter parallel beam 23 is provided. The beam 23 is connected to the rear ends of the members 18 and 19. Brace members 24 and 25 connect the ends of the beam 23 to the body of the frame 10.

The caster wheels 11, 12, 13 and 14 are identical. Each includes an upstanding swivel shaft 26 which is rotatably received in a sleeve 27 on the frame 10 to mount the caster wheel thereto. The caster wheel 11 is mounted on the front transverse frame member 20. The wheels 12 and 13 are mounted on the rear beam 23. The wheel 14 is mounted upon the left end brace 22.

The rotor 15 is positioned in front of the main diagonal beam 17 and between the perpendicular members 18 and 19 of the frame 10. The rotor 15, in its simplest form, comprises a shaft or axle 28 which has two oppositely disposed spiralling rows of radial teeth 29 fixed thereto as shown in Figure 1. Each row of teeth 29 spirals one full revolution around the shaft 28. The rotor 15 is rotated at a relatively high speed in the direction of the arrow a in Figure 3 to rake the tips of the teeth 29 along the ground and to break up and spread out matted straw dumps encountered thereby. The rows of teeth spiral about the shaft 28 from the front of the rotor toward the rear in a direction oposite to the direction of rotation of the rotor. The teeth 29 move forwardly as they engage the ground and throw the straw forwardly and diagonally outwardly over a wide area. As illustrated in Figure 3, the tips 29a of the teeth are bent rearwardly somewhat to facilitate in preventing accumulation of straw, etc. thereon.

I have found that best results can be obtained and a minimum of power expended if the rotor 15 is mounted so that it rides lightly over the surface of the ground in a substantially weightless condition with just enough force to pick up the straw without undue ground disturbance, and if it is free to rise and fall with respect to the frame 10 to follow ground contours. In order to mount the rotor 15 in this manner, I provide on the frame 10 a pair of rotor supporting arms 30 and 31 which overlie the spaced apart frame members 18 and 19. The rotor supporting arms are pivoted upon pivot pins 32 that are supported on ears 33 extending upwardly from the underlying members 18 and 19 (see Figures 3 and 6). At a distance forwardly from the pivot pins 32, the arms 30 and 31 support bearings 28a between which the rotor shaft 28 is journalled. The rotor 15 is movable vertically with respect to the frame 10 by movement of the arms 30 and 31.

To counterbalance the rotor 15 so that it will ride substantially weightlessly, I provide a pair of weighted counterbalance arms 34 and 35 on the frame 10. The counterbalance arms 34 and 35 are positioned vertically above the rotor supporting arms 30 and 31, and each counterbalance arm is pivoted intermediate its ends on a pivot pin 36 mounted between a pair of mounting arms 37 which are fixed to and extend upwardly from the underlying frame member 18 or 19 of the frame 10. As shown in Figure 5, the arms 37 of each pair are secured to the side edges of the frame member 18 or 19 and extend upwardly at each side of the rotor supporting arm 30 or 31 thereabove. The mounting arms 37 thus also act as guides to prevent transverse movement of the rotor supporting arms.

The purpose of the counterbalance arms 34 and 35 is to balance the weight of the rotor 15 on the arms 30 and 31. To this end, each of the counterbalance arms 34 and 35 is provided with link means comprising a depending flexible connector 38 which is secured to the rotor supporting arm 30 or 31 therebelow. At the end of each counterbalance arm opposite the connector 38 a weight 39 is affixed. The weight 39, being on the opposite side of the pivot pin 36 (which is the fulcrum of the arm 34 or 35) from the connector 38 tends to rock the arm about the pin 36 and, consequently, tends to raise the rotor supporting arm 30 or 31 therebeneath, thus counterbalancing the weight of the rotor 15. As shown in Figure 3, the weight is spaced considerably farther from the pivot point 36 than the connector 38 and thus enjoys a substantial mechanical advantage. This permits use of a relatively small weight 39 on each arm 34 and 35. The amount of counterbalancing force can be varied by changing the weight or by adjusting the distance thereof from the pivot pin 36. For best results, the weights 39 should be adjusted so that the rotor 15 rests lightly upon the ground and will freely follow the ground contour.

Figure 4:
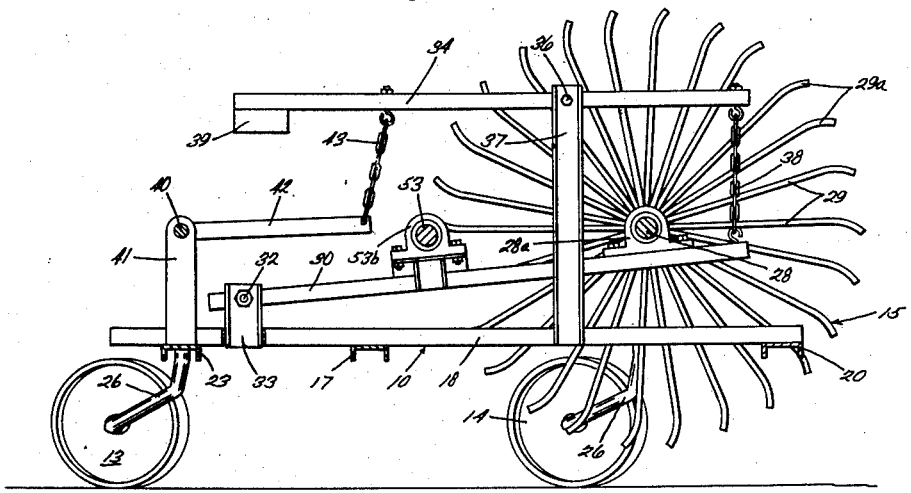
Figure 4 is a view similar to Figure 3, but showing the parts in adjusted position.

I have found that it is necessary to have some means for positively raising and lowering the rotor 15 with respect to the frame 10. To provide such means, and at the same time preserve the counterbalanced, floating feature, I provide on the frame 10 a shaft 40 which extends parallel to and behind the rotor 15. The shaft 40 is rotatably journalled in brackets 41 which extend upwardly from the rear beam 23 of the frame 10. Adjacent each of the counterbalance arms 34 and 35, a forwardly extending lever 42 is fixed to the shaft 40. The levers 42 are connected to the counterbalance arms 34 and 35 at points spaced behind the pivot pins 36 by short flexible conectors 43. Assuming the levers 42 to be held stationary by means described below, the flexible connectors 43 will operate to limit the extent of downward movement of the rotor 15, but will not affect the counterbalancing operation above the lower limit. By pivoting the levers 42, the lower limit may be varied, and the rotor 15 can also be lifted well clear of the ground for transportation purposes as shown in Figure 4.

To provide for control of the levers 42, the shaft 40 to which they are fixed, is provided with an upstanding lever arm 44 that is connected by a link 45 to a pivoted control lever 46, (see Figure 7). The control lever 46 is mounted upon bracket means 47 carried by the frame 10 and is positioned so that it normally extends forwardly from the frame 10 to be within reach of the operator of the towing vehicle. The control lever has a standard locking pawl mechanism 48 that cooperates with a rack 49 to maintain the control lever 46 in any adjusted position. Examination of the drawings will show that with the construction just described, manipulation of the control lever 46 will result in rotation of the shaft 40 and consequent adjustment of the limiting levers 42.

As earlier herein mentioned, the rotor 15 is rotated at a fairly high speed in the direction of the arrow a in Figure 3. To drive the rotor a pulley 50 is fixed on the rotor shaft 28 adjacent the rotor supporting arm 30. Belt means 51 connect this pulley 50 with a drive pulley 52 that is fixed on a stub shaft 53 journalled in bearing 53a and 53b on the arm 30 rearwardly of the rotor shaft 28. Power is supplied to the drive pulley 52 by means of a universal drive shaft 54 which is coupled to the stub shaft 53 through a universal joint 55, and which is connected to power-take-off point on the towing vehicle.

It is believed that the operation of the machine is apparent from the foregoing description. When the device is coupled to a towing vehicle and the rotor 15 is set in motion, the operator need only guide the machine along a row of straw dumps so that the diagonally positioned rotor passes over them. The rotating teeth 29 of the rotor 15 will effectively break the dumps up and spread the straw therefrom outwardly and forwardly over a wide area so that it will not hinder or defeat proper cultivation of the field. The counterbalanced rotor 15 will automatically adjust to the ground contour and will ride over any obsructions, etc. that it cannot throw aside.

My improved straw spreading machine is designed to be drawn from one side, as indicated in Figure 1, so that the towing vehicle does not travel over the straw dumps to be manipulated, and so that the towing vehicle and the operator thereof are clear of the flying straw, etc. thrown from the rotor 15. In order to maintain the frame 10 in proper position as it is drawn through the fields, and at the same time, maintain the required flexibility between the spreader and the towing vehicle, I construct the tow frame 16 in a novel manner. As shown in Figures 1 and 10, the tow frame 16 includes a pair of forwardly extending, diverging arms 56 and 57 which are pivoted by pivot means 58 to the beam 20. The arms 56 and 57 mount a transverse bar 59 therebetween at their forward ends. It will be noted that the bar 59 is connected to the arms 56 and 57 by pivot means 60 so that it is free to tilt up and down with respect to the beam 20 and one end of 59 may move up or down somewhat with respect to the other end thereof. The transverse bar provides universal hitch means for coupling to a tractor draw-bar such as that shown at 61 in Figure 1. The bar 59 has longitudinally spaced holes through which pins 62 and 63 may be passed to rigidly mount draw-bars such as the one shown at 61. As shown in Figure 10, the bar 59 also has laterally spaced holes through which pins 64 and 65 may be passed to receive tractor draft frames such as shown at 66.

To prevent the frame 10 from swinging out of proper alignment during operation of the machine, a triangular shaped framework 67 is pivoted to the beam 20 beside the arms 56 and 57. The frame 67 is pivoted to the beam 20 by pivot means 68 and is coupled to the bar 59 by a hook member 69. It will be noted that the frame 67 does not hinder the flexibility of the hitch, but does strengthen it against lateral pivotal movement with respect to the frame 10.

In Figures 8 and 9, I have shown modified forms of the rotor 15 wherein the teeth are constructed somewhat differently. In Figure 8, the teeth are shown as bars 29' which are securely bolted to flanges 70 on the rotor shaft 28'. The bars 29' operate in the same manner as the teeth 29 of the main form of the invention but are more sturdy, and more easily replaced.

In Figure 9 the teeth are shown as bars 29" which are pivoted on flanges 71 on the rotor shaft 28". The bars 29" are yieldingly held in radial position by springs 72 which are anchored to ears 73 on the shaft 28". The springs 72 permit the bars 29" to pivot back upon encountering a rock or other obstruction to avoid undue breakage.

It is believed that the nature and advantages of my invention appear clearly from the foregoing description and the accompanying drawings.

Having thus described my invention, I claim:

1. A device for breaking up and spreading matted piles of vegetation comprising a wheeled framework, said framework including a main beam with two spaced apart frame members mounted thereon and extending perpendicular thereto intermediate the ends of said beam, a second beam connected between one end of said first named beam and one of the extended frame members and extending diagonally between the extended frame member and the beam, a tow frame pivoted on said second beam for up and down swinging movement and having means thereon for attachment to a tow vehicle, a rotor having a shaft above said two spaced apart frame members and having spiral rows of radially extending teeth thereon between the frame members, rotor supporting arms carrying said shaft and overlying said two frame members, means on the said two frame members pivotally supporting the arms, counterbalance arms positioned above the rotor supporting arms, mounting arms fixed to and extending upwardly from the two frame members and pivotally supporting the counterbalance arms, said counterbalance arms having flexible connectors at one end extending down to the rotor supporting arms and connected thereto, and having weights at the other end.

2. The invention defined in claim 1, together with a shaft pivoted on said framework having levers fixed thereon and extending beneath the weights on the counterbalance arms, flexible connectors between said levers and the counterbalance arms and means connected to the last named shaft operable to adjust the levers up and down.

3. The invention defined in claim 1, together with a triangular shaped framework pivoted to said second beam to swing up and down and having a hook attached to the tow frame.

4. A device for breaking up and spreading matted piles of vegetation comprising a wheeled framework, said framework including a main beam with two spaced apart frame members mounted thereon and extending perpendicular thereto intermediate the ends of said beam, a second beam connected between one end of said first named beam and one of the extended frame members and extending diagonally between the extended frame member and the beam, a tow frame pivoted on said second beam for up and down swinging movement, a triangular shaped framework pivoted to said second beam to swing up and down, said tow frame having a front transverse bar provided with means to attach it to a tow vehicle, said triangular shaped framework being coupled to the front transverse bar by a hook member, a rotor having a horizontal axle and having a plurality of substantially radially extending teeth, said rotor being positioned between the spaced apart frame members with its axle diagonal to the direction of travel, and means on the framework supporting the axle for rotation and for up and down movement with respect to the framework.

References Cited in the file of this patent

UNITED STATES PATENTS

| | | |
|---|---|---|
| 868,593 | Blevins et al. | Oct. 15, 1907 |
| 1,911,391 | Randall | May 30, 1933 |
| 2,350,173 | Louchs et al. | May 30, 1944 |
| 2,695,487 | Glienke | Nov. 30, 1954 |